Oct. 13, 1959      W. E. PARKER ET AL      2,908,189
COMBINATION ENGINE STARTER AND CONSTANT SPEED DRIVE
Filed June 12, 1957      6 Sheets-Sheet 1

Fig.1.

INVENTORS:
EVART R. CHAPMAN,
DELMOND L. GETZ,
HEBER T. HERTZOG,
WILTON E. PARKER, &
WILLIAM D. WHITAKER.
BY

Herschel C. Omohundro
Attorney.

COMBINATION ENGINE STARTER AND CONSTANT SPEED DRIVE

Wilton E. Parker, Encino, Calif., and William D. Whitaker, Delmond L. Getz, Heber T. Hertzog, and Evart R. Chapman, Phoenix, Ariz., assignors to The Garrett Corporation, Los Angeles, Calif., a corporation of California Application June 12, 1957, Serial No. 665,147

15 Claims. (Cl. 74—675)

This invention relates generally to aircraft accessories and is more particularly directed to starters and transmissions for driving accessories, such as generators, which must be operated at substantially constant rates.

In present day aircraft, much equipment powered by electric current is employed and one of the problems encountered is to drive the generators or alternators for producing such current at substantially constant rates by the aircraft engines, the rates of operation of which vary widely depending upon whether the aircraft is taking off, climbing, cruising or preparing to land. Heretofore, aircraft have been provided with differential transmissions which compensate for differences between the rates of engine operation and the required rate of operation of the accessory. Such prior transmissions have been complicated in construction, imposed weight penalties on the aircraft, required excessive servicing and have been limited in their use because of certain inherent characteristics. For example, some of the prior transmissions have utilized hydraulically operated drive systems to compensate for different rates of operation of the engines and accessories. The fluid temperatures in such systems run quite high, due to the method of compensation, and thereby create cooling problems, especially in aircraft operating at high speeds, which cause high ram air temperatures.

An object of the invention is to provide a constant speed accessory drive mechanism for use in combination with an engine of the type having an air compressor, the drive mechanism being driven in part by the engine through mechanical motion transmitting means and in part by an air turbine motor which is operated by compressed air bled from the engine, the drive mechanism having means through which the air turbine motor serves as a trimming means to justify the speed input from the engine so that the speed output of the drive mechanism will be maintained constant. The drive mechanism also includes means for utilizing the residual power in the exhaust from the air turbine motor to conserve bleed air energy.

Another object of the present invention is to provide a combination starter and constant speed transmission in which some of the objections of the prior devices are eliminated, first, by utilizing parts to perform dual functions thus decreasing the total weight of the equipment and, second, by employing a novel gearing arrangement to compensate for differences in rates of revolution of the engine and the generator, or other accessory. By employing the novel gearing, a greater percentage of the power used to drive the accessory during cruising operation, when maximum efficiency relative to fuel consumed is essential, will be supplied directly by the engine under the control of another part of the transmission.

Another object of the invention is to provide a combination engine starter and constant speed drive mechanism which may be coupled directly to and carried by an engine and function to initiate the operation of the engine upon being supplied with motivating fluid from an extraneous source, then after the engine operation has commenced will receive both mechanical and fluid power from the engine to effect the operation of an accessory at a controlled rate of speed or revolutions per minute. The mechanism will also function to drive an accessory to produce usable power, such as electrical energy, which may be used for ground checking equipment or other purposes when the main engine is not running.

Still another object of the invention is to provide a constant speed transmission having a differential gear set into which power is fed by the aircraft engine and by a variable speed fluid motor, the gear set having an operative connection with an accessory, such as a generator, to be driven at a constant speed, the gear set having parts which serve to compensate for variations in rates of rotation of the engine, such parts being under the control of the fluid motor, means also being provided to vary the speed of operation of the fluid motor in response to a tendency of the accessory to vary in operating speed.

Another object of the invention is to provide a constant speed transmission of the type set forth in the preceding paragraph and in which means are provided to vary the operation of parts of the gear set so that power supplied to the transmission by the fluid motor will be conducted directly to the engine to effect a starting operation thereof.

A further object of the invention is to provide a constant speed transmission having a differential gear means provided with a plurality of sets of planetary gears which are carried by a common spider or frame; power is supplied to the frame by the aircraft engine, a fluid motor being employed to drive one set of the planetary gears, the other set being operatively connected with the accessory, both sets of planetary gears meshing with a common ring gear assembly so that power supplied by the engine and the fluid motor will be transmitted to the accessory at a rate monitored by the fluid motor. The transmission is further provided with a control system to govern the functions of various parts so that the apparatus will be substantially automatic in operation.

Another object of the invention is to provide a combination engine starter and constant speed drive having a variable speed fluid motor, such as an air turbine with variable area nozzles, the apparatus also having a control system in which speed sensing devices are provided to effect, first, the conversion of the apparatus from a starter to a constant speed drive after engine operation is initiated, second, the adjustment of the variable area nozzles to govern the fluid motor speed and consequently the rate of operation of an accessory, and, third, the interruption of operation of the apparatus in the event of overspeed due to breakage or faulty operation of certain parts.

Other objects and advantages of the invention will be apparent from the following description and the accompanying drawings, in which one embodiment of the invention has been illustrated in detail.

Figure 1:
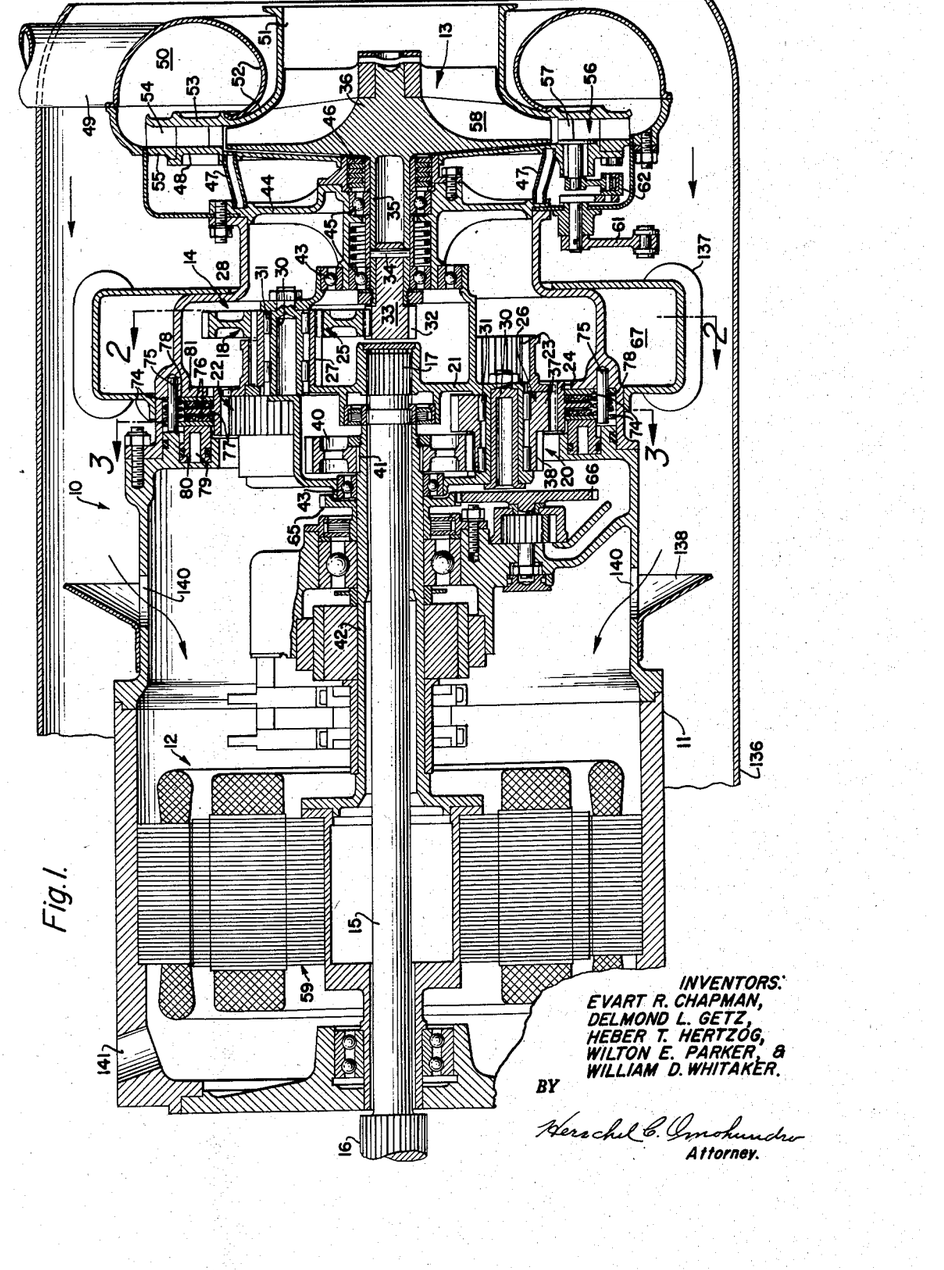
Fig. 1 is a longitudinal sectional view taken through a combination starter and consant speed transmission formed in accordance with the invention.

Referring more particularly to the drawing and especially Fig. 1, the combination starter and constant speed transmission shown therein is designated generally by the numeral 10. In the form of the invention illustrated, the device comprises, generally, a housing 11 formed of a suitable number of parts and adapted to be secured to the forward portion of an aircraft engine, such as a jet engine. The housing provides an enclosure for receiving a generator designated generally by the numeral 12, a turbine 13 at the forward end of the housing, and a transmission between the turbine and the generator, the transmission being indicated generally by the numeral 14.

As pointed out in the objects, one feature of the invention is to provide a combined starter and transmission for driving an accessory, such as a generator, at a constant speed. To carry out this object, use is made of the transmission 14, which is of the differential gear type. In the present instance the differential gear transmission is supported in the housing 11 and is arranged to be driven, in part, by a shaft 15 which is directly connected with the aircraft engine, and the turbine 13 which is preferably air operated and generally classed as an air turbine motor. The shaft 15 has a spline 16 at the rear end which provides a connection with the aircraft engine either directly with the main shaft of the engine or a transmission (not shown) driven thereby. The forward end of the shaft 15 is also splined as at 17 to form a driving connection with the differential gear transmission 14.

Figures 2, 5:
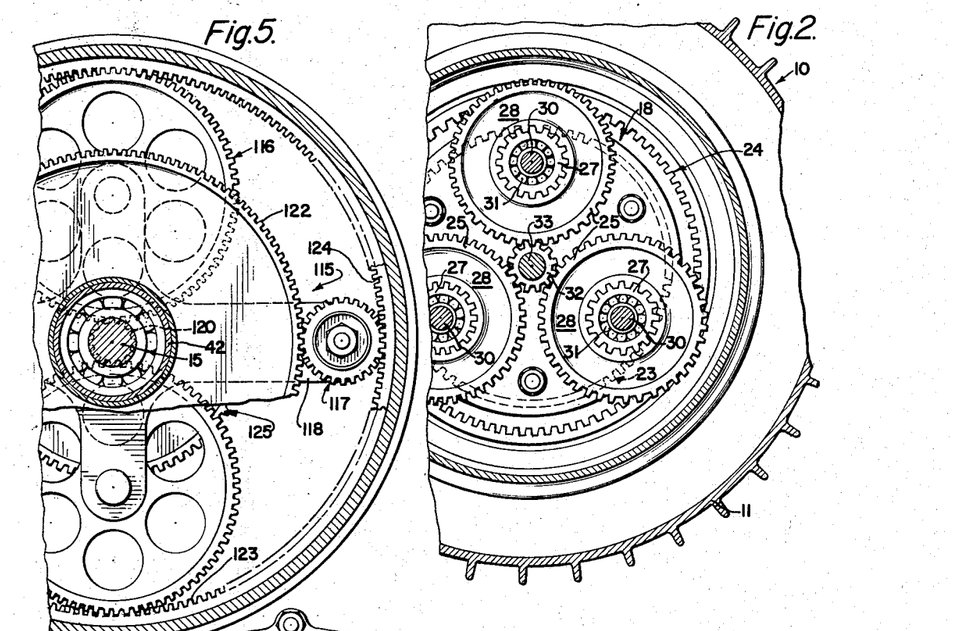
Fig. 2 is a vertical transverse sectional view taken on the plane indicated by the line 2—2 of Fig. 1.
Fig. 5 is a vertical transverse sectional view taken on the plane indicated by the line 5—5 of Fig. 4.
Figure 3:
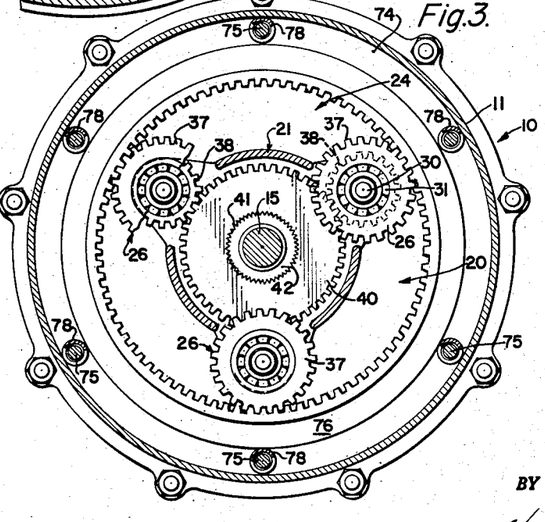
Fig. 3 is a similar view taken on the plane indicated by the line 3—3 of Fig. 1.

In the first embodiment of the invention illustrated, the gear mechanism 14 includes a plurality of sets of planetary gears 18 and 20, the planet gears of which are carried by a spider frame 21 to which the forward end of the shaft 15 is connected by the spline 17. The transmission 14 also includes a ring gear assembly 22, which, in the form of the invention shown in Fig. 1, has two ring gear sections 23 and 24 of different pitch diameters, the section 23 being smaller than the section 24. As illustrated in Figs. 2 and 3, each set of planetary gears includes three planet gears, the gears meshing with ring section 23 being designated by the numeral 25 and those meshing with ring section 24 being designated by the numeral 26. Each of planet gears 25 includes two spur gears 27 and 28 which may be formed separately and nonrotatably secured together, as illustrated, or formed of a single blank depending upon the desires of the manufacturer. The smaller spur gear elements 27 mesh with the ring gear section 23 and are held in this engagement by the spider frame 21 on which the planet gears of both sets 25 and 26 are carried.

To effect the support of the planet gears, the spider frame 21 has a plurality of stub shafts 30 carried thereby, these stub shafts being provided with roller or other suitable bearings 31 to effect the rotatable support of the planet gears. The larger gears 28 of the set 25 are disposed in meshing engagement with a pinion 32 carried by one end of a short torsion shaft 33, this shaft being pinned as at 34 to a hollow shaft 35 projecting rearwardly from the wheel 36 of the air turbine motor. The larger gears 37 of the set 26 of planet gears are disposed in meshing engagement with the ring section 24, while the smaller gears 38 thereof mesh with a spur gear 40, which is keyed as at 41 to the forward end of a hollow shaft 42 forming part of the generator 12. This generator may be of any desired type conventionally used in aircraft.

As shown in Fig. 1, the spider 21 is supported in the housing 11 by suitable bearings 43 to provide proper stability and to permit the spider to revolve freely during the operation of the mechanism. The bearings for supporting the forward end of the spider are mounted on a partition 44 extending transversely across the housing 11 adjacent the forward end and immediately behind the turbine 13. This partition is also provided with bearings 45 for rotatably supporting the turbine wheel 36, suitable seal means 46 being provided around the shaft 35 of the turbine wheel to prevent the flow of air or other turbine driving fluid into the housing 11, or the escape of lubricating medium from the housing at this point. The housing 11 supports the turbine in any suitable manner, bars 47 being illustrated as projecting forwardly from the housing 11 and carrying part of the turbine housing 48 at their forward ends.

The turbine housing includes a supply conduit 49 connected with a substantially annular inlet passage 50 which may be formed of suitable components secured to one another by welding, or otherwise. Turbine housing 48 also includes a tubular portion 51 which merges into a shroud 52 of modified frusto-conical formation, the base portion 53 forming a part of the inlet nozzle passage 54 of the turbine. The passage 54 is also formed by a wall 55, constituting a part of the turbine housing.

One of the features of the invention resides in using an air turbine motor with a variable area nozzle mechanism 56. This mechanism includes vanes 57 which are supported between the walls 53 and 55 and are pivotally adjustable to vary the volume and direction of air flowing from the passage 50 through the passage 54 to the blades 58 on the turbine wheel 36. This turbine wheel is of the centripetal type wherein air supplied to the wheel flows radially inwardly and is then discharged axially through the tubular portion 51 of the housing to any suitable exhaust conduit. Such air could, if desired, be conducted to the air inlet of the jet engine to which the combination starter and transmission 10 is an accessory, or it might be supplied to the rear portion of the jet engine to assist in supporting combustion in an afterburner and contribute to the force of the reaction jet thrust. It may also be advantageous to partially cool the compressed air before introducing it to the turbine 13 and then after being discharged therefrom the air will be sufficiently cool to use in cooling the cabin or other compartments.

In the operation of the apparatus as a constant speed transmission, power is supplied from the engine to the differential gearing through the shaft 15 and from the turbine wheel 36 through the shaft 33. This power will cause the planetary gears to revolve and impart rotary motion to the shaft 42 through the spur gear 40. Rotation of the shaft 42 will cause similar movement of the armature 59 of the generator 12 to produce electric power. As is well known, the generator armature must be driven at a uniform rate to cause the generator to produce current of constant frequency.

To secure this constant rate of operation, the turbine speed is varied to compensate for variations in the rate of operation of the aircraft engine. Means are provided to change the speed of operation of the turbine by adjusting the vanes 57 which serve as variable area nozzles, through the operation of a lever 61 and motion transmitting mechanism 62.

Lever 61 may be operated by any suitable actuator as will be set forth hereinafter. It will be obvious that as shaft 15 is driven by the aircraft engine, the spider 21 will be revolved and will carry with it the planet gears of both sets. Since these planet gears have portions meshing with the ring gear assembly, this mechanism will also be revolved. It will also be obvious that since portions of the planet gears of one set mesh with pinion 32 which is driven by the turbine wheel 36, the rate of movement of the ring gear assembly will depend upon the rate of movement of the pinion 32. The pitch diameters and number of teeth of the various gears forming the transmission are calculated to cause the generator shaft 42 to be driven at the required speed when the turbine and the aircraft engine are operated at predetermined rates. If the speed of operation of the aircraft engine is changed, the nozzles for the turbine will necessarily have to be adjusted to cause the rate of operation of the turbine wheel to change so that the ring gear assembly will continue to drive the spur gear 40 and shaft 42 at the required generator speed. For each engine speed the turbine wheel will be required to operate at a compensatory rate.

Figure 6:
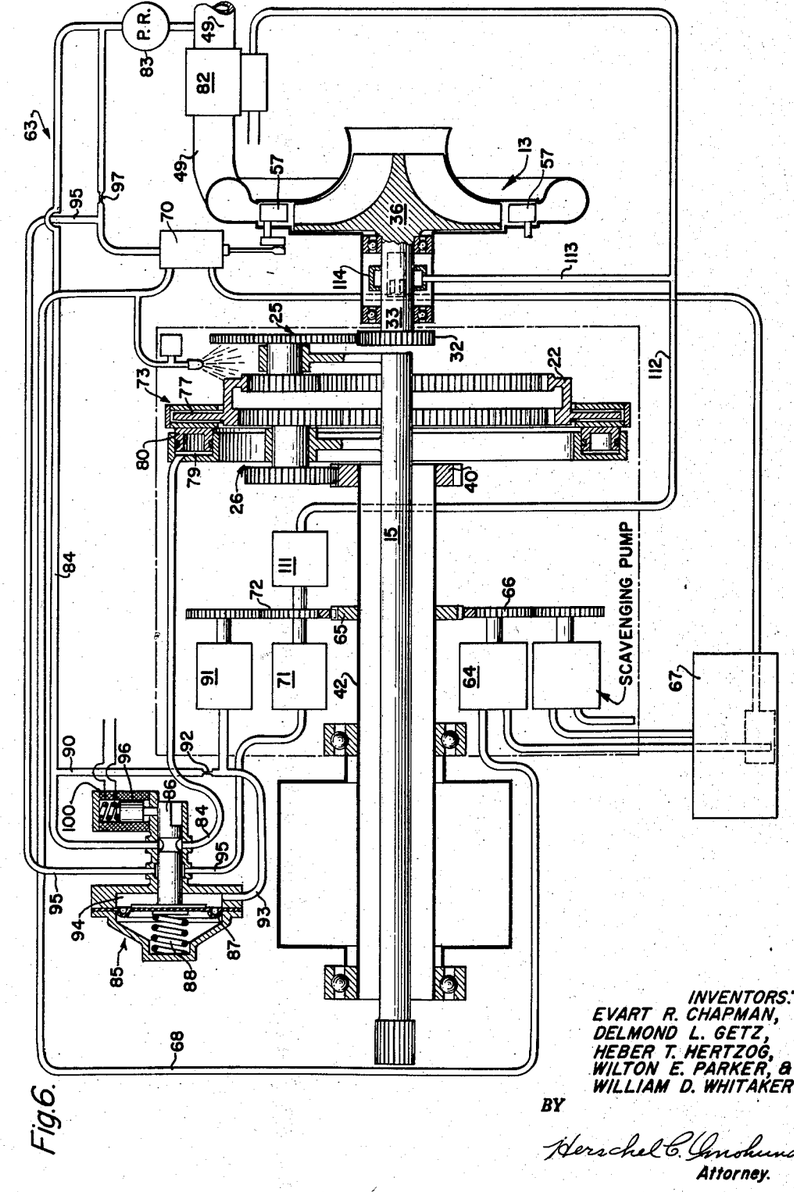
Fig. 6 is a schematic view of the combination starter and constant speed transmission and a combined hydraulic and pneumatic control system therefor, the control system being diagrammatically illustrated.

To effect the adjustment of the turbine nozzles, the device is provided with a control system 63, shown diagrammatically in Fig. 6, which is partially hydraulic and partially pneumatic. An all-pneumatic system such as that shown diagrammatically in Fig. 7 may be employed if desired. In the control system 63 shown in Fig. 6, the hydraulic portion includes a gear pump 64 which is driven by a gear 65 carried by the shaft 42 and meshes with a pump driving gear 66. The pump 64 draws fluid from the housing or a reservoir 67 forming a part thereof, and supplies it under pressure to a conduit indicated by the numeral 68. This conduit leads to a combination servo and hydraulic actuator 70 for moving the variable area nozzle vanes 57, the actuator being pneumatically controlled by a speed sensing governor 71 which is driven by the generator shaft 42 through gears 65 and 72 and is responsive to the rate of operation of such shaft.

The governor 71 may be of any suitable type such as that disclosed in application Serial No. 391,099, filed November 9, 1953, now Patent No. 2,858,839 dated November 4, 1958, by John K. Jackson, and entitled, "Precision Pneumatic Speed Sensing Governor." Such governor may be set for a predetermined rate of operation of the generator. If this rate tends to change, the speed sensor transmits a signal to the actuator 70 causing it to adjust the turbine nozzle to increase or decrease the rate of operation of the turbine wheel to compensate for such change. The tendency to change the rate of operation of the generator may result from a variation in the speed of the aircraft engine or from any other cause. It will be obvious from the foregoing that when the transmission forming the subject matter of the invention is in operation, the speed sensor governor 71 will be affected by any tendency of the generator speed to change and will convey a signal to the actuator causing the nozzles of the turbine to be adjusted, whereby the turbine wheel speed will be changed. This change will be transmitted through one set of planet gears to the ring gear assembly causing this mechanism to compensate for the change and maintain the effective speed of rotation being transmitted to the generator shaft. A constant rate of operation and consequently a current of constant frequency will be developed by the generator.

Another feature of the invention resides in employing the turbine to initiate the operation of the aircraft engine. To secure this result, the mechanism is provided with a brake device, indicated generally by the numeral 73, including ring plates 74 which are held against rotary movement by being slidably supported on pins 75 projecting from a part of housing 11. These plates carry friction elements 76 which are disposed on opposite sides of a rotating ring 77 provided on the ring gear assembly. In the form of the invention shown in Fig. 1, the rotating ring 77 is provided on the larger ring gear section 24. Springs 78 are disposed between the nonrotatable ring plates 74 to urge them away from the rotatable ring 77.

The casing 11 at one side of the brake mechanism, is provided with an annular piston chamber 79 for the reception of an annular piston 80. At the opposite side of the brake mechanism, the casing is formed with a backing flange 81, the rings 74, 76 and 77 being disposed between the piston 80 and the backing flange 81. When fluid under pressure is supplied to the piston chamber 79, the piston will be moved toward the brake mechanism causing the movable ring 77 to be clamped between the friction rings 76 and held in a stationary position. Since the ring 77 forms a part of the ring gear assembly, this assembly will also be held stationary when sufficient fluid pressure is supplied to the piston chamber 79. By holding the ring gear assembly stationary while fluid under pressure is supplied to turbine 13, rotatary motion transmitted to the planet gears 25 will cause the gears 27 to roll around the inside of the smaller ring gear section 23 and impart rotary movement to the shaft 15 through the spider 21. This movement of shaft 15 will be transmitted directly to the engine shaft causing the rotary elements of the engine to be driven at a rate directly proportional to the rate of operation of the turbine wheel. When the brake is in operation during the starting phase, the generator shaft will be driven as before by the planet gears 26 but the generator is unloaded at this time through the opening of a suitable switch (not shown), and the rate of operation will be unimportant.

As illustrated in Fig. 6 the control system 63 is provided with an air regulator and shutoff valve mechanism 82 which is connected with inlet conduit 49 leading to the turbine 13. Valve 82 may be of any suitable type such as that illustrated, at 24, in Wood application Serial No. 150,564, filed March 20, 1950, now abandoned, or in Jensen's application Serial No. 566,723, entitled, "Modulating and Shutoff Valve," filed February 20, 1956, now Patent No. 2,884,003, issued April 28, 1959. Valve 82 includes a solenoid or other electrical means for starting and interrupting the operation of the system. Conduit 49 may extend to any suitable source of compressed air but will preferably lead to a high pressure stage of the engine for which the apparatus 10 is an accessory. Conduit 49 also includes a branch connection, not shown, to which an extraneous source of fluid pressure, such as provided on a ground support cart, may be connected for engine starting purposes. This branch connection should be of the quick disconnect type and have a self-closing valve operative when the extraneous source is disconnected, to close the branch connection and prevent loss of fluid pressure from duct 49.

When fluid, such as air, under pressure is supplied to conduit 49 and valve mechanism 82, a conduit 84 branching from conduit 49 will be pressurized to supply the pneumatic section of the control system 63. Conduit 84 is provided with a suitable regulator 83, diagrammatically indicated in Fig. 6, to maintain the desired pressure in the control system 63. In such systems, conduit 84 leads to a starting selector valve 85 which has been schematically illustrated in Fig. 6, as including a spool 86 operatively connected with a wall 87 which is biased in one direction by a spring 88. A passage 90 branches from conduit 84 and leads to a second speed sensor 91 which is similar to governor 71 but is of the normally open type which permits air to bleed from passage 90 to the atmosphere until a predetermined speed of rotation is attained by the shaft 42. Passage 90 contains a restriction 92 and at the downstream side thereof is connected by a branch 93 with a chamber 94 at the side of the movable wall 87 opposite that engaged by spring 88. Passage 84 leads from valve 85 to the piston cylinder 79. When chamber 94 is not pressurized, spring 88 will tend to urge spool 86 to the position in which it is shown in Fig. 6. In such position fluid pressure from line 84 is supplied to piston chamber 79 and piston 80 will be urged toward a position to set brake 73 and hold the ring gear assembly stationary. Rotation of the turbine wheel 36 at this time will cause engine starting motion to be applied to the shaft 15 as previously described. Also as described, rotary motion will be imparted to the generator shaft 42.

The second speed sensor 91 is responsive to the rotation of shaft 42 and is so adjusted that when shaft 15 is rotated at a speed sufficient to cause the engine to start, sensor 91 will prevent air bleed from passage 90 and chamber 94 will be pressurized. As a result, wall 87 will move in opposition to spring 88 causing the spool 86 to shift from the position shown, to a second position in which a conduit 95 branching from conduit 84 will communicate with speed governor 71.

Spool 86 is so formed that when it occupies the second-mentioned position, i.e., one in which passage 95 communicates with speed sensor 71, piston chamber 79 will be vented and brake 73 will be released. This operation will take place automatically when the engine is rotated at a speed sufficient to cause it to start. When the valve spool 86 is moved to place speed governor 71 in control, a spring pressed latch 96 will be actuated to prevent spool 86 from moving out of such position even though chamber 94 becomes unpressurized such as by discontinuing engine operation.

Conduit 95 contains a restriction 97 and is connected at the downstream side thereof with the servo and nozzle actuator so that speed governor 71 may, by varying the escape of air from line 95 to atmosphere, control the flow of hydraulic fluid to the actuator 70 and the adjustment of the turbine nozzle vanes 57. If, after engine operation has been discontinued, compressed air is supplied to the turbine 13 the generator will be driven, power being transmitted from the turbine wheel 36 through pinion 32 and planet gears 25 to the ring gear assembly 22 and from the latter through planet gears 26 and gear 40 to the generator shaft 42. The load imposed by the inoperative engine will resist movement of the shaft 15 and spider 21. The generator may be operated in this manner when it is desired to ground check the electrical equipment and the aircraft engines are not running. Speed governor 71 functions, as usual, to control the rate of operation of the turbine and consequently the generator speed during the ground checking operations.

To place the apparatus 10 in condition to start the engine, a selector switch (not shown) is momentarily actuated to energize a solenoid coil 100 which serves to release lock 96 and permit spring 88 to shift spool 86 to the starting position in which it is shown in Fig. 6. When air pressure is then supplied to the turbine 13, the brake 73 will be applied and power will be transmitted to the shaft 15 as previously described. When the engine reaches starting speed and sensor 91 operates as previously described, to automatically shift the selector valve and release the brake mechanism, the switch for loading the generator may be actuated and the constant speed drive mechanism will operate normally. As long as the mechanism is operating to drive the generator at the required speed, the spool 86 of the selector valve 85 will be retained in position by air pressure in chamber 94 to cause governor 71 to control even though the solenoid coil 100 should be accidentally or intentionally energized.

It will be noted that shafts 15 and 33 and the gears will absorb and damp substantially all shock which might tend to result from the application of starting power to the jet engine.

Figure 7:
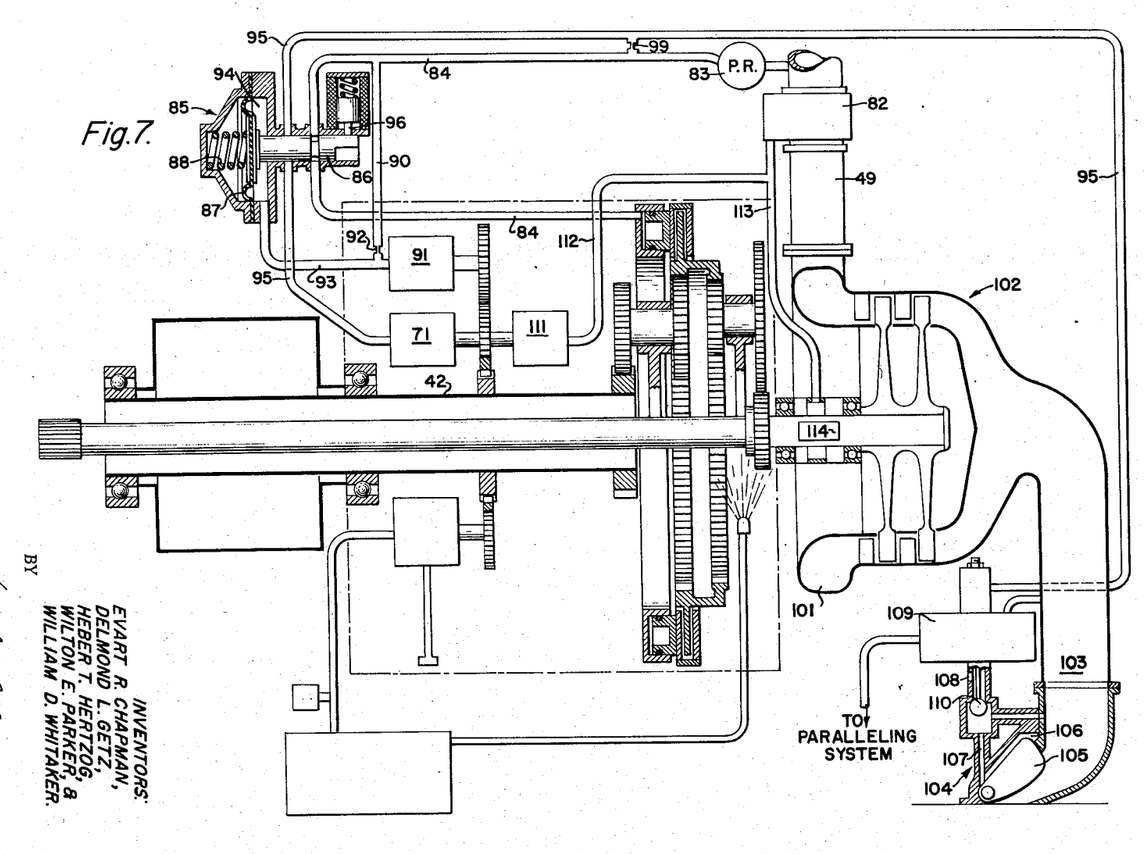
Fig. 7 is a schematic view of a modified form of combination starter and constant speed accessory drive with an all-pneumatic control system therefor illustrated diagrammatically.

The modified control system shown in Fig. 7 is substantially the same as that shown in Fig. 6 but is entirely pneumatic. In the system shown in Fig. 7 the regulator and shutoff valve 82 is connected with the inlet to the turbine as before and branch conduit 84 with regulator 83 extends from conduit 49 to selector valve 85. Spool 86 of valve 85 is movable, as in the first system, to connect sensor 91 into the system to terminate the engine starting phase when the engine lights off. Valve 85 also releases the brake when sensor 91 gives the signal. In Fig. 7, conduit 95, which leads through valve 85 to governor 71, receives compressed air from line 84 through a reduced orifice 99. The system in Fig. 7 includes a turbine 102, which is disclosed as a two-stage axial flow turbine to show that either type of turbine will serve the purpose. The turbine 102 has an annular inlet manifold 103 communicating with inlet duct 49 to receive motivating fluid and an exhaust passage 101. Turbine speed is controlled in this form of the invention by a variable exit nozzle indicated generally by the numeral 104. The nozzle 104 has a movable element 105 which is responsive to fluid pressure in a chamber 106 at one side thereof, to move to vary the flow of exhaust fluid through passage 101. In this manner, pressure at the outlet side of turbine 102 may be varied and consequently the speed of the turbine will also be changed.

To supply variable pressure to chamber 106, a passage 107 extends from exhaust passage 101 to such chamber. A bleed outlet 108 to atmosphere from passage 107 is controlled by a fluid pressure operated valve 110 to increase or decrease pressure in chamber 106. Valve 110 is controlled by governor 71 through passage 95 which extends to an actuator 109. The action of other apparatus may be controlled through a line leading from actuator 109 as indicated in Fig. 7, by the legend "Two paralleling system."

It will be noted that nozzle 104 causes the exhaust fluid to issue in a jet stream which may react with the ambient atmosphere to assist the aircraft engine in moving the aircraft. The residual energy in the compressed air supplied to and discharged from the turbine is thus extracted.

Both control systems are provided with similar safety features including means for interrupting the operation of the turbines in the event the generator or turbine should overspeed. To secure these features, the systems are provided with a third speed sensor 111 arranged to be driven by the governor shaft 42 and communicating via a line 112 with the regulator and shutoff valve 82. Line 112 communicates with a branch 113 which extends to an overspeed sensing device 114 disposed in the turbine shaft. The device 114 may be of any suitable type such as that shown in co-pending application Serial No. 612,603, filed September 28, 1956, for "Overspeed Prevention Means," by William D. Whitaker. If either the generator or the turbine wheel should exceed predetermined speeds, the respective member 111 or 114 will operate to vent line 112 to the atmosphere, and shutoff valve 82 will automatically interrupt fluid flow to the turbine thus preventing damage to the apparatus and possible injury to personnel.

From the illustrations of the different systems, it will be observed that adjustable nozzles may be used in the turbine inlet or in the turbine outlet to control turbine speed. It should be obvious that adjustable nozzles could be used in both the inlet and outlet of a turbine, if desired. It has also been pointed out that the energy remaining in the turbine exhaust fluid may be extracted and utilized to increase the power output of the aircraft engine. It should also be recognized that the energy in the exhaust fluid could be extracted in other ways, as will be pointed out hereinafter with reference to Figs. 8 to 11, inclusive.

Figure 4:
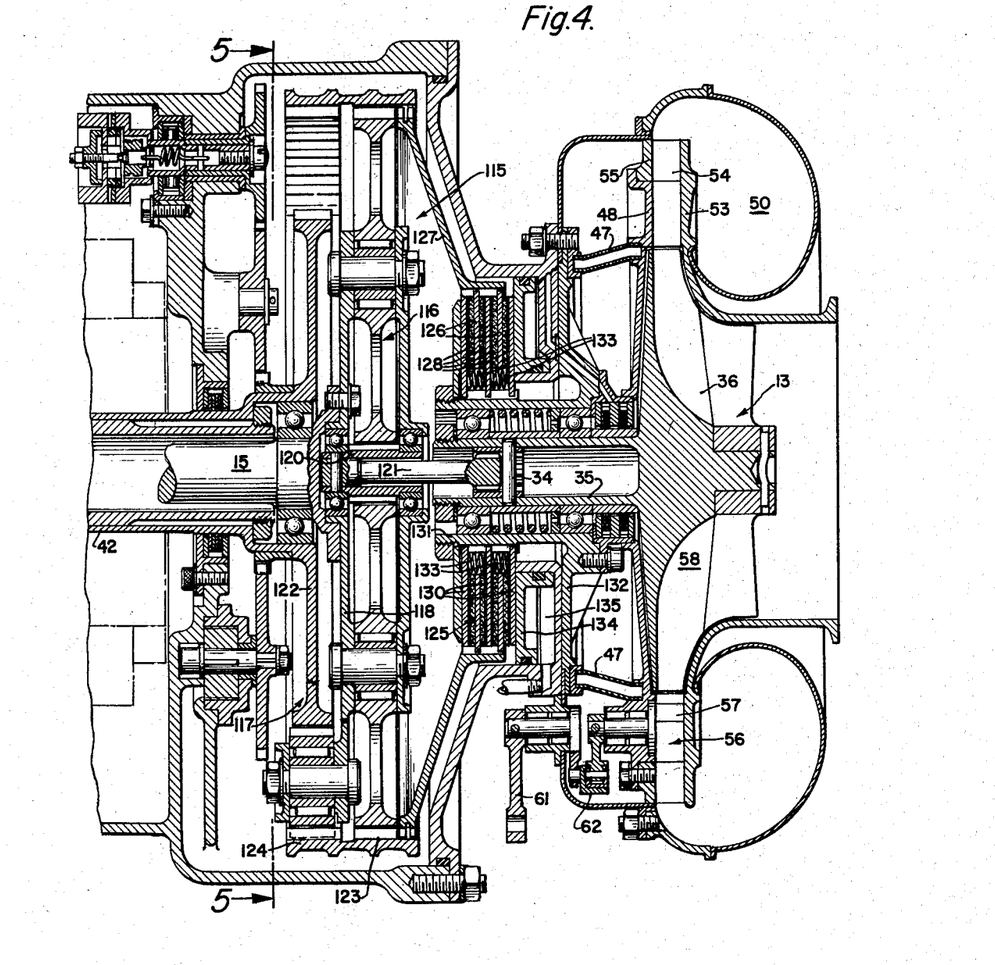
Fig. 4 is a view similar to Fig. 1 of a slightly modified form of combination starter and constant speed accessory drive.

In the modified form of the invention shown in Figs. 4 and 5, the engine driven shaft 15, and the turbine 13 are substantially identical with the corresponding parts in the form of the invention shown in Fig. 1. These parts, however, impart power to a slightly different transmission 115 which is similar to the transmission shown in Figs. 1, 2 and 3, in that two sets 116 and 117 of planet gears are provided. These sets of gears each include two gears which, as in the first form of the invention, are rotatably mounted on a spider frame 118 secured to the end of shaft 15. The gears of set 116 are of relatively large diameter and mesh with a pinion 120 coupled to the end of torsion shaft 121 which is connected for operation by turbine motor 13.

Planet gears 117 are relatively small and mesh with a gear 122 carried by the end of the generator shaft 42, as in the first form of the invention. Both sets of planet gears mesh with a ring gear assembly having sections 123 and 124, also as in the first form but in the modified form the ring gear sections 123 and 124 are of the same pitch diameter.

In the form of the invention shown in Figs. 4 and 5, the brake mechanism 125 is disposed in axially offset relationship to the ring gear assembly. It is composed of a plurality of rings 126 which are secured for rotation with the ring gear assembly 123—124, by a conically shaped ring plate 127 having a splined engagement with the ring gear assembly and the brake rings 126. The latter rings are disposed between rings 128 of friction material and nonrotatable brake rings 130 which are splined to a tubular projection 131 extending rearwardly from a partition 132 forming part of the housing for the apparatus. Coil springs 133 between rings 130 urge them away from the rings 126 to permit rotary movement of the ring gear assembly. These springs also serve to urge an annular piston 134 forwardly in piston chamber 135 when the brake is to be released.

The operations of the modified form of transmission are substantially the same as those of the first form. For example, when the engine starting operation is to be performed, fluid pressure is supplied to the piston chamber 135 to move piston 134 and cause nonrotatable rings 130 to apply braking force to the rings 126. These rings, being part of the ring gear assembly, will oppose the rotation thereof whereby rotation of the turbine wheel will be imparted by shaft 121 and pinion 120 to planet gears 116 causing these gears to roll around the inner side of ring gear section 123. Since gears 116 are carried by spider frame 118, rotary movement will be imparted to this member and thus to shaft 15 to which it is secured. Movement of spider frame 118 also causes planet gears 117 to roll around the inner side of ring gear section 124 and impart rotary movement to gear 122 which is secured to generator shaft 42. The generator armature, being mounted on this shaft, will revolve also but, as in the form of the invention first described, the rate of rotation at this time is unimportant because the generator is unloaded.

It will be obvious from the foregoing that the differences between the modified form of the invention shown in Figs. 4 and 5 and the form shown in Fig. 1 are only in mechanical construction and relation of parts; the functions are substantially identical.

Numerous advantages may result from the use of apparatus incorporating the present invention. For example, as illustrated in Fig. 1, a cover or nacelle 136 may be provided around the combination starter and constant speed accessory drive, the nacelle being open at the front to admit ram air. The housing 11 may also be provided with cooling fins 137 for engagement by the ram air so that heat may be extracted from oil or other fluid contained in the reservoir 67. Some of the ram air may also be caused to flow into the housing 11 by an annular scoop 138 projecting from the housing 11 at the rear of air admitting openings 140 formed in housing 11. Air flowing into openings 140 passes around the rotor and stator of the generator to effect cooling thereof and then flows out of housing 11 through exhaust openings 141 at the rear of the generator.

Another example of an advantage resulting from the use of apparatus incorporating the invention is the reduction of total engine weight by eliminating unnecessary accessory pads from the engine as well as gearing for transmitting power from the engine to additional accessories and vice versa.

An ancillary advantage resulting from the invention is an increase in efficiency of the turbine during engine letdown at altitude and consequent decrease in power contributed to the transmission by the engine at which time the turbine must be operated at higher speed to compensate for such decreased engine power.

Figure 8:
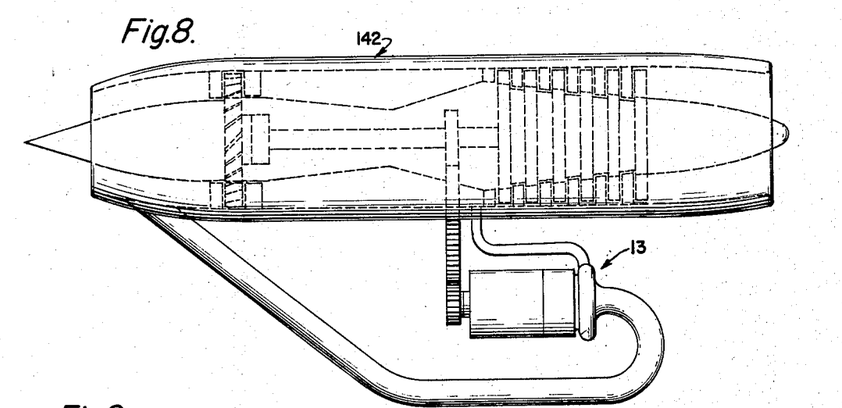
Figs. 8 to 11, inclusive, are schematic views illustrating various ways of extracting residual energy from the fluid exhausted from the turbine.

As may be understood, the use of turbine type motors may cause reduced over-all efficiency due to the fact that the motive fluid being exhausted therefrom contains considerable residual energy. One of the features of the present invention is to provide the apparatus with means for extracting the residual energy from the exhaust fluid and thereby increase the over-all efficiency of a propulsion system equipped with the constant speed drive and from which the bleed air for operating the turbine of the drive means is received. As has previously been pointed out and is illustrated in Fig. 8, the exhaust from the turbine 13 could be conducted to rear portion of the engine 142 and added to the exhaust from the main turbine to augment the jet reaction stream.

Figures 9, 10:
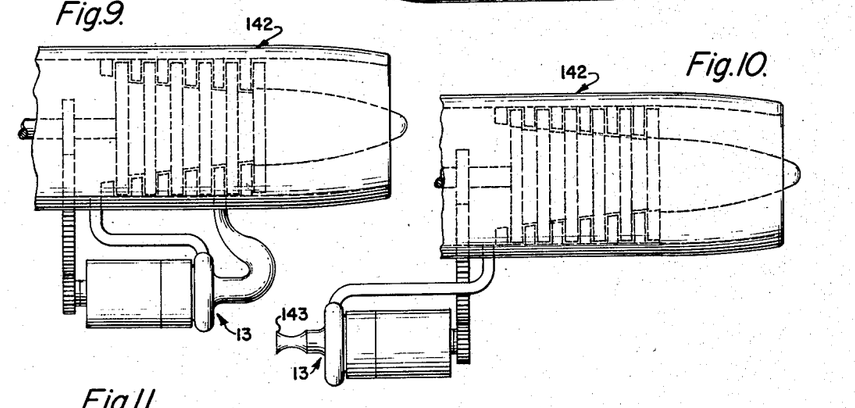

In Fig. 9, the exhaust fluid is conducted from turbine 13 to an intermediate stage of the compressor of the main engine. The residual energy of the exhaust fluid will thus be utilized rather than wasted.

In Fig. 10, the exhaust fluid is discharged directly to the ambient atmosphere through a suitable jet nozzle 143; the use of such nozzle is not mandatory, however.

Figure 11:
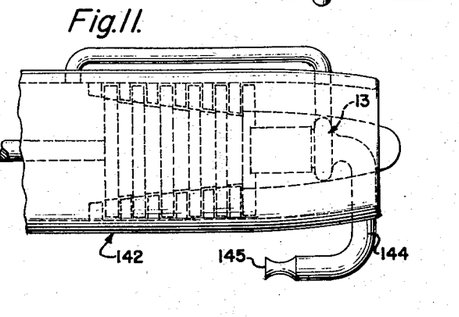

Fig. 11 shows the constant speed drive mechanism provided with an exhaust duct 144 having a jet nozzle 145 at the outlet end. As illustrated more in detail in Fig. 7, such nozzle may be adjustable if desired. The jets issuing from the nozzles in Figs. 7, 10 and 11 react on the ambient atmosphere to augment the thrust of the main engine.

In all of the installations depicted, the turbine is supplied with bleed air from the final or a high pressure stage of the main engine compressor. It should be understood that pressure fluid from any suitable source, such as other engine driven compressors, bottled fluids, various types of combustors, or even ram air may be used to drive the turbine.

While several modifications have been illustrated and described in detail, it is obvious that many minor changes may be made in the construction and relation of parts without departing from the concept of the invention.

We claim:

1. A combination engine starter and constant speed accessory drive comprising: a first element formed for connection with an accessory to transmit rotary motion thereto; a differential gear transmission having at least two sets of planet gears carried by a common frame member, said planet gears meshing with a common ring gear assembly; a sun gear for each set of planet gears, one sun gear being connected with said first element; a second element connected with said common frame member, said second element being formed for operative connection with an engine to transmit power therefrom to said transmission; a variable speed fluid actuated turbine operatively connected with the other sun gear to transmit power to said transmission, said transmission serving to drive said first element at a rate proportional to the rate of operation of said turbine; and means responsive to change in the rate of operation of said first element to control the rate of operation of said turbine.

2. A combination engine starter and constant speed accessory drive comprising: a first element formed for connection with an accessory to transmit rotary motion thereto; a differential gear transmission having at least two sets of planet gears carried by a common frame member, said planet gears meshing with a common ring gear assembly; a sun gear for each set of planet gears, one sun gear being connected with said first element; a second element connected with said common frame member, said second element being formed for operative connection with an engine to transmit power therefrom to said transmission; a fluid actuated turbine operatively connected with the other sun gear to transmit power to said transmission; adjustable nozzle means for controlling the direction and rate of operation of said turbine, said transmission serving to drive said first element at a rate determined by the rate of operation of said turbine; and means responsive to change in the rate of operation of said first element for adjusting said nozzle means to control the rate of operation of said turbine.

3. A combination engine starter and constant speed accessory drive comprising: a first element formed for connection with an accessory to transmit rotary motion thereto; a differential gear transmission having at least two sets of planet gears carried by a common frame member, said planet gears meshing with a common ring assembly; a sun gear for each set of planet gears, one of said sun gears being connected with said first element; a second element connected with said common frame member, said second element being formed for operative connection with an engine to transmit power therefrom to said transmission; a fluid actuated turbine operatively connected with the other sun gear to transmit power to said transmission; and brake means for restraining said ring gear assembly against rotary motion to cause said transmission to conduct power from said turbine to said second element.

4. A combination engine starter and constant speed accessory drive comprising: a first element formed for connection with an accessory to transmit rotary motion thereto; a differential gear transmission having at least two sets of planet gears carried by a common frame member, said planet gears meshing with a common ring gear assembly; a sun gear for each set of planet gears, one of said sun gears being connected with said first element; a second element connected with said common frame member, said second element being formed for operative connection with an engine to transmit power therefrom to said transmission; a fluid actuated turbine operatively connected with the other sun gear to transmit power to said transmission; brake means for restraining said ring gear assembly against rotary motion to cause said transmission to conduct power from said turbine to said second element; and means operative when the rate of operation of one of said elements exceeds a predetermined figure to render said brake means inoperative.

5. A combination engine starter and constant speed accessory drive comprising: a first element formed for connection with an accessory to transmit rotary motion thereto; a differential gear transmission having at least two sets of planet gears carried by a common frame member, said planet gears meshing with a common ring gear assembly; a sun gear for each set of planet gears, one of said sun gears being connected with said first element; a second element connected with said common frame member, said second element being formed for operative connection with an engine to transmit power therefrom to said transmission; a variable speed fluid actuated turbine operatively connected with the other sun gear to transmit power to said transmission, said transmission serving to drive said first element at a rate proportional to the rate of operation of said turbine; brake means for restraining said ring gear assembly against rotary motion to cause said transmission to conduct power from said turbine to second element; means operative when the rate of operation of one of said elements exceeds a predetermined figure to render said brake means inoperative; and means responsive to change in the rate of operation of said first element for varying the rate of operation of said turbine.

6. A combination engine starter and constant speed accessory drive comprising: a first element formed for connection with an accessory to transmit rotary motion thereto; a differential gear transmission having at least two sets of planet gears carried by a common frame member, said planet gears meshing with a common ring gear assembly; a sun gear for each set of planet gears, one of said sun gears being connected with said first element; a second element connected with said common frame member, said second element being formed for operative connection with an engine to transmit power therefrom to said transmission; a fluid actuated turbine operatively connected with the other sun gear to transmit power to said transmission; adjustable nozzle means for controlling the direction and rate of operation of said turbine, said transmission serving to drive said first element at a rate determined by the rate of operation of said turbine; brake means for restraining said ring gear assembly against rotary motion to cause said transmission to conduct power from said turbine to said second element; means operative when the rate of operation of one of said elements exceeds a predetermined figure to render said brake means inoperative; and means governed by the rate of operation of said first element for adjusting said nozzle means to vary the rate of operation of said turbine and maintain constant the rate of operation of said first element.

7. In combination with an engine of the type having an air compressor: a constant speed accessory drive comprising a first element formed for connection with an accessory to transmit motion thereto; a differential gear means; a second element formed for operative connection with the engine to transmit power therefrom to said gear means; an air turbine motor having inlet and outlet passages, said motor being operatively connected with said gear means to transmit power thereto, said gear means serving to drive said first element at a rate governed by the rate of operation of said air turbine motor; means for resisting movement of a portion of said gear means to provide for a positive transmission of power from said air turbine motor to said second element; a first means responsive to the operation of said first element at a predetermined speed to render said movement resisting means inoperative; adjustable means disposed in one of the passages of said air turbine motor to vary the rate of operation of said motor; a second means responsive to a tendency of said first element to vary from a predetermined rate of operation to actuate said adjustable means and vary the rate of operation of said motor to maintain the rate of operation of said first element; and selector means operatively connected with said first speed responsive means and automatically operative when said first speed responsive means is actuated to render said first speed responsive means ineffective and said second speed responsive means effective.

8. In combination with an engine of the type having an air compressor: a constant speed accessory drive comprising a first element formed for connection with an accessory to transmit motion thereto; a differential gear means; a second element formed for operative connection with the engine to transmit power therefrom to said gear means; an air turbine motor having inlet and outlet passages, said motor being operatively connected with said gear means to transmit power thereto, said gear means serving to drive said first element at a rate governed by the rate of operation of said air turbine motor; means for resisting movement of a portion of said gear means to provide for a positive transmission of power from said air turbine motor to said second element; a first means responsive to the operation of said first element at a predetermined speed to render said movement resisting means inoperative; adjustable means disposed in one of the passages of said air turbine motor to vary the rate of operation of said motor; a second means responsive to a tendency of said first element to vary from a predetermined rate of operation to actuate said adjustable means and vary the rate of operation of said motor to maintain the rate of operation of said first element; selector means operatively connected with said first speed responsive means and automatically operative when said first speed responsive means is actuated to render said first speed responsive means ineffective and said second speed responsive means effective; and locking means for retaining said selector means in condition to render said first speed responsive means ineffective after the automatic operation of said selector means, the release of said locking means being manually controlled.

9. A constant speed engine accessory drive and starter mechanism comprising: an engine accessory provided with a hollow drive shaft; a differential gear means at one end of said accessory, said gear means having at least two sets of planet gears carried by a common frame member, said planet gears meshing with a common ring gear assembly; a sun gear for each set of planet gears, one of said sun gears being connected with the hollow drive shaft of said accessory; shaft means connected with said planet gear supporting frame and projecting through said hollow drive shaft for operative connection with an engine; and a variable speed fluid actuated turbine supported at the opposite end of said differential gear means from said accessory, the wheel of said turbine being connected with the other sun gear to transmit power to said transmission.

10. A constant speed engine accessory drive and starter mechanism comprising: an engine accessory, a differential gear means and a variable speed fluid operated turbine secured together on a common axis, said accessory having a hollow shaft; a plurality of sets of planet gears in said differential gear means; a frame member supporting said sets of planet gears; a shaft connected with said frame member and projecting through the hollow shaft of said accessory for operative connection with an engine; a sun gear for each set of planet gears, one sun gear being connected with said hollow shaft and another being connected with the wheel of said turbine; a ring gear assembly surrounding and meshing with said sets of planet gears; and brake means for restraining said ring gear assembly against rotation at predetermined times.

11. A constant speed engine accessory drive and starter mechanism comprising: an engine accessory provided with a hollow drive shaft; a differential gear means supported at one end of said accessory, said gear means having at least two sets of planet gears carried by a common frame member; a shaft extending through the hollow drive shaft of said accessory for operative connection to an engine, said shaft being connected with said common frame member; a ring gear assembly surrounding and meshing with said sets of planet gears; a sun gear for each set of planet gears, said sun gears being disposed for rotation about the axis of said shaft; and a variable speed fluid operated turbine supported at the opposite end of said differential gear means from said accessory, the wheel of said turbine being connected with one of said sun gears and the other sun gear being connected with the hollow drive shaft of said accessory.

12. In a combination engine starter and constant speed accessory drive mechanism, the combination comprising: casing means formed at one end for attachment to an accessory to be driven at constant speed and at the other end for attachment to a fluid turbine; differential gear means in said casing means, said differential gear means having a sun gear connected with an operating element of the accessory and a second sun gear connected with the wheel of the turbine; a set of planet gears meshing with each of said sun gears; a frame member supporting said planet gears; shaft means connected with said frame member and projecting through said accessory for operative connection with an engine; and a ring gear assembly surrounding and meshing with said planet gears, said differential gear being driven in part by the engine and in part by the turbine to effect the operation of said accessory.

13. In a combination engine starter and constant speed accessory drive mechanism, the combination comprising: casing means formed for disposition and support between an accessory to be driven at constant speed and a fluid actuated turbine motor; differential gear means in said casing means with the operating axis thereof aligned with the axes of rotation of the accessory and turbine motor, said differential gear means having a planetary gear carrier frame; a shaft connected with said frame and projecting through the accessory for operative connection with an engine; planet gears supported on said carrier frame, a ring gear assembly surrounding and meshing with said planet gears; a plurality of sun gears meshing with said planet gears, one of said sun gears being connected with an operating element of the accessory and another sun gear being connected with the wheel of said turbine motor; brake means connected in part with said ring gear assembly and serving to restrain the same against rotation at predetermined times; and means responsive to the speed of rotation of one of said sun gears for controlling an action of said brake means.

14. In a combination engine starter and constant speed accessory drive of the type having a first element formed for operative connection with an engine, a second element formed for operative connection with an accessory, and a variable speed fluid motor, a differential gear mechanism comprising: a frame member connected with said first element; a plurality of sets of planet gears mounted for rotation on said frame member; a ring gear assembly in meshing engagement with said sets of planet gears; brake means formed for operative engagement with said ring gear assembly to control movement thereof; and a sun gear for each set of planet gears, one sun gear being connected with said fluid motor and one sun gear being connected with said second element.

15. In a combination engine starter and constant speed accessory drive of the type having a first element formed for operative connection with an engine, a second element formed for operative connection with an accessory, and a variable speed fluid motor, a differential gear mechanism comprising: a frame member connected with said first element; a plurality of sets of planet gears mounted for rotation on said frame member; a ring gear assembly in meshing engagement with said sets of planet gears; brake means formed for operative engagement with said ring gear assembly to control movement thereof; means responsive to the speed of operation of one of said elements to effect a predetermined operation of said brake means; and a sun gear for each set of planet gears, one sun gear being connected for operation by said fluid motor and one sun gear being connected with said second element.

References Cited in the file of this patent

UNITED STATES PATENTS

| | | |
|---|---|---|
| 2,402,547 | Gilfillan | June 25, 1946 |
| 2,582,848 | Price | Jan. 15, 1952 |

FOREIGN PATENTS

| | | |
|---|---|---|
| 201,121 | Australia | Feb. 2, 1956 |

UNITED STATES PATENT OFFICE

CERTIFICATE OF CORRECTION

Patent No. 2,908,189                                                                             October 13, 1959

Wilton E. Parker et al

It is hereby certified that error appears in the printed specification of the above numbered patent requiring correction and that the said Letters Patent should read as corrected below.

Column 11, line 10, after "ring" insert -- gear --; line 60, after "to" insert -- said --.

Signed and sealed this 5th day of April 1960.

(SEAL)
Attest:

EARL H. AXLINE
Attesting Officer

ROBERT C. WATSON
                                                                        Commissioner of Patents